United States Patent
Hayes

(10) Patent No.: US 7,145,674 B2
(45) Date of Patent: Dec. 5, 2006

(54) METHOD AND APPARATUS FOR DETERMINING A LOCATION OF DATA IN AN OPEN SPECIFICATION ENVIRONMENT

(75) Inventor: Katherine E. Hayes, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1008 days.

(21) Appl. No.: 09/737,883

(22) Filed: Dec. 15, 2000

(65) Prior Publication Data

US 2004/0205449 A1 Oct. 14, 2004

(51) Int. Cl.
*G06F 15/00* (2006.01)
(52) U.S. Cl. ...................................... 358/1.15
(58) Field of Classification Search ............... 358/1.1, 358/1.15, 1.18, 1.2, 538; 715/500.1, 500, 715/530; 707/1, 3, 10; 430/30; 709/203, 709/206; 271/272, 90
See application file for complete search history.

(56) References Cited

U.S. PATENT DOCUMENTS

| | | | |
|---|---|---|---|
| 5,375,202 A | | 12/1994 | May et al. |
| 6,421,694 B1 * | 7/2002 | Nawaz et al. | 715/526 |
| 6,738,155 B1 * | 5/2004 | Rosenlund et al. | 358/1.15 |
| 2001/0002204 A1 * | 5/2001 | Jebens et al. | 375/240.01 |
| 2004/0015479 A1 * | 1/2004 | Meek et al. | 707/1 |

OTHER PUBLICATIONS

LinNet Solutions, *Pre-Press Environments*, www.linnetsol.co.uk © 2000 Linnet Solutions Ltd., 3 pages.
OPI Open Prepress Interface Specification 1.3, Sep. 22, 1993, Copyright 1989-1993 Aldus Corporation, pp. 1-15.

* cited by examiner

*Primary Examiner*—Kimberly Williams
*Assistant Examiner*—Saeid Ebrahimi-Dehkordy
(74) *Attorney, Agent, or Firm*—Fay, Sharpe, Fagan, Minnich & McKee, LLP

(57) ABSTRACT

A comment is compared to path mappings within a network for identifying a potential pathname of output data for an object within the publication data. If the output data is does not exist at the potential pathname, the comment is compared to search paths within the network to identify the potential pathname of the output data within the publication data. The potential pathname is substituted for the comment in the publication data. The publication data is prescanned. Optionally, the output data is gathered at a local disk. The publication data is output to an output medium via an output device.

13 Claims, 5 Drawing Sheets

METHOD AND APPARATUS FOR DETERMINING A LOCATION OF DATA IN AN OPEN SPECIFICATION ENVIRONMENT

BACKGROUND OF THE INVENTION

This invention relates to a method and apparatus for interpreting publication data. More particularly, the invention is directed to a method and system for processing comments, which are created in an open specification system, that relate to objects in the publication data. It will be appreciated, however, that the invention is also amenable to other like applications.

Documents displayed on a processing device (e.g., computer) are typically converted to a Page Description Language (PDL), such as Postscript or PDF, before being printed. Page layout applications (e.g., PageMaker) are often used to create these documents, and to insert and manipulate high-resolution, data intensive images. Since the data is typically voluminous, such images cannot be easily manipulated (magnified, rotated, etc.) on-the-fly. Therefore, with the Postscript and PDF PDLs, a method (e.g., "Open Prepress Interface" (hereinafter abbreviated to "OPI")) has been employed in which the high-resolution image data portion of the document is stored in respective files, possibly at locations remote from the client computer. Corresponding low-resolution images are created and possibly stored at separate locations from the high-resolution images. These low-resolution images, or "proxy" images, are then inserted in the document, along with references to the high-resolution versions. Because the low-resolution image utilizes substantially less data, it is possible for a user to manipulate such images significantly faster, and using less of the client computer's resources (disk space, memory, processor time), than a corresponding high-resolution image. For each proxy image inserted in the document, a set of comments is created, conforming to the OPI specification; these comments reference the location of the high resolution image, as well as indicating any manipulations made to the proxy image, which must be made to the corresponding high-resolution image before it is printed. The software which generates the proxy image and OPI comments can be referred to as an OPI producer, and may be either part of an OPI package or a page layout application.

When it is desirable to print the document, including the high resolution versions of inserted images, produced with page layout applications utilizing OPI, the document is converted to the PDL, which is transmitted to a server or series of servers for print processing. A print processing device decomposes the PDL data according to a raster image processing (RIP) technique, which translates the Postscript data into bits. The device which performs this activity will hereinafter be referred to as a RIP server. Either prior to RIP or on-the-fly during RIP, the same or another device interprets the OPI comments in the PDL, retrieving and substituting the high-resolution image data, and modifying the data to reflect the manipulations made by the user to the proxy image.

Heretofore, the OPI software packages store and retrieve both the high-resolution and low-resolution image data. Because the conventional OPI packages perform the storage operations, the locations of the high and low-resolution image data are known. Therefore, retrieving that data to perform the print operations is easily achieved. Until now, it has not been possible to reliably locate the high and low-resolution image data using an OPI package that was not used to store the data.

The present invention provides a new and improved apparatus and method that overcomes the above-referenced problem and others.

SUMMARY OF THE INVENTION

A method for determining a location of an image referenced within a stream of document data finds a comment within the data stream. A location of the image is determined as a function of the comment.

In accordance with one aspect of the invention, a reference to the image within the data stream is identified as a function of the comment. The location of the image is determined as a function of the reference.

In accordance with another aspect of the invention, the location of the image is determined by identifying a potential mapping to a potential location of the image.

In accordance with a more limited aspect of the invention, an additional potential mapping to an additional potential location of the image is identified.

In accordance with another aspect of the invention, the location of the image is determined by identifying a potential search path to a potential location of the image.

In accordance with a more limited aspect of the invention, an additional search path to an additional potential location of the image is identified.

In accordance with another aspect of the invention, the data stream is prescanned for verifying the image exists at the location.

In accordance with a more limited aspect of the invention, if the original data does not exist at the potential location, a location of the image is manually entered. The data stream is prescanned for verifying the manually entered location of the image.

In accordance with another aspect of the invention, the image is gathered at a local location.

One advantage of the present invention is that it accommodates publication data created according to a different open specification standard than is currently used.

Another advantage of the present invention is that it efficiently interprets comments within Postscript commands for use with third party Open Prepress Interface servers.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
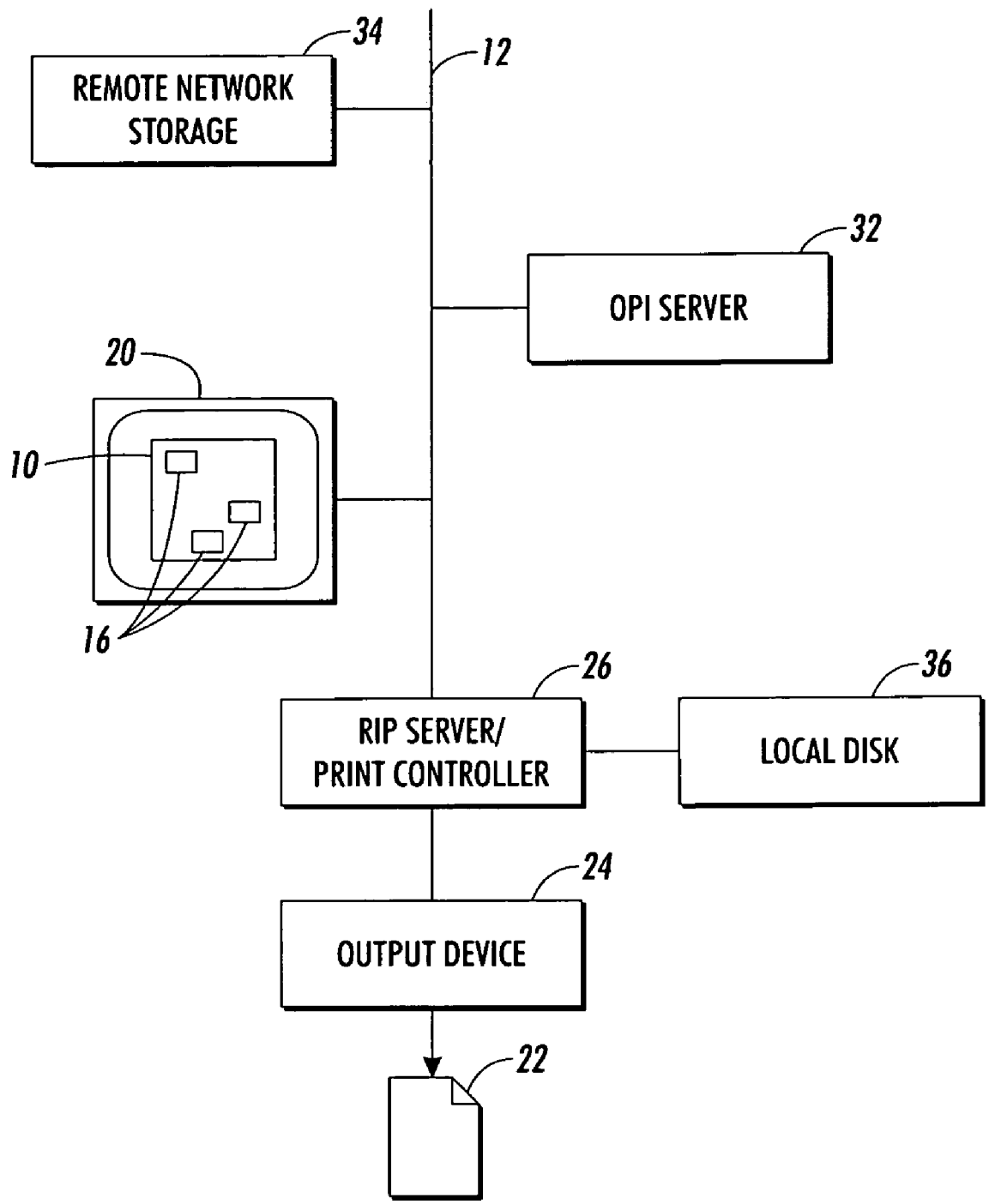
FIG. 1 illustrates a system for producing an output according to the present invention.
Figure 2:
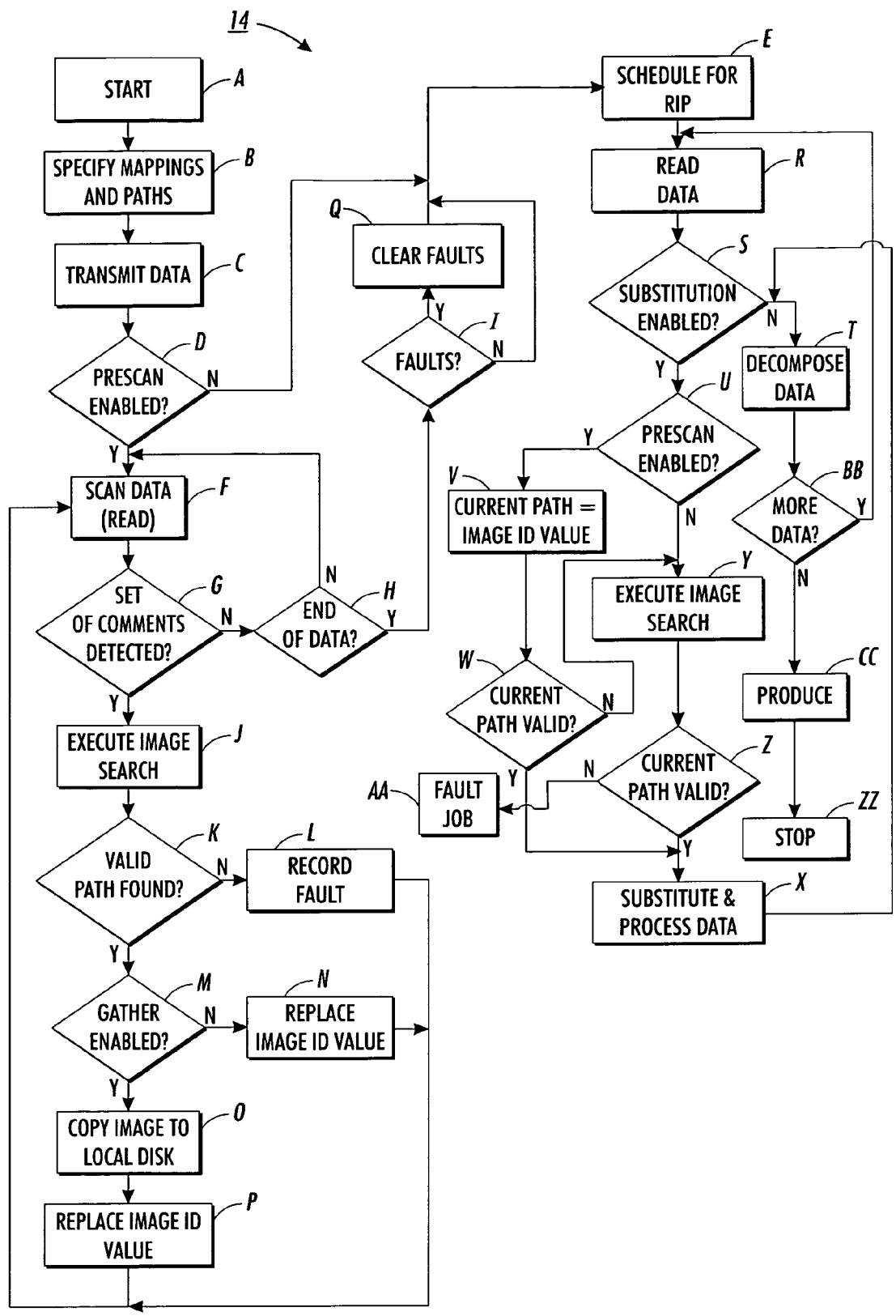
FIG. 2 illustrates a flowchart for producing the output according to the present invention.

With reference to FIGS. 1 and 2, an electronic publication 10 (e.g., document) is processed in a network 12 according to a method 14, which starts in a step A. A data stream (publication data) representing the electronic publication 10 is formatted as PDL data (e.g., Postscript data), for example, and includes various objects 16 (e.g., images) that are represented on a video display device 20 in a low-resolution format. The low-resolution format allows a user to move and/or manipulate the objects 16 within the publication 10 much faster than is possible with corresponding high-resolution versions of the objects 16. As discussed above, however, it is preferable to produce high-resolution versions of the objects 16 on an output medium 22 when the publication 10 is produced (e.g., printed) via an output device 24. It to be understood that there is preferably one (1) "processing device", i.e. the printer controller, which both processes the OPI comments and performs a raster image processing (RIP) operation.

In the preferred embodiment, the output device 24 is a digital output device (e.g., a digital printing device), which operates in a xerographic environment. Optionally, the output device 24 is a color output device.

For purposes of clarity, the term pathname is assumed to refer to a path (including a directory) and a filename.

The publication data (i.e., data stream) includes two (2) types of open specification (e.g., Open Prepress Specification ("OPI")) comments that reference the locations of original data corresponding to the high and low-resolution images. More specifically, a low-resolution comment, referenced, for example, as "ImageFileName", provides a full pathname (including filename) for the low-resolution image; a high-resolution comment, referenced, for example, as "ImageID", is more loosely defined and optionally provides some identifier or pathname for the high-resolution image. It is to be understood that the publication data may also include comments representing modifications (e.g., scaling, placement, etc.) made to the objects 16 within a page layout application program (e.g., PageMaker).

Before the publication data is processed according to a raster image processing (RIP) technique, a system administrator describes an open specification standard environment within the network 12. More specifically, the system administrator specifies, in a step B, at least one of two types of potential identifiers for image path information. For example, the system administrator specifies path mappings and/or search paths. It is assumed in the method of the present invention that the information entered by the system administrator is more likely to be useful than the comment values alone. Furthermore, it is assumed that the ImageID comment, if supplied in the publication data, provides more relevant information than the ImageFileName comment for locating the high-resolution image.

Path mapping is used if the comments tend to specify paths to storage locations where data for the high-resolution versions of the objects 16 are stored, but specify the paths in a way that is not recognized by a RIP server 26 (e.g., printer controller) in the network 12. For example, paths as recognized and recorded in the comments by a "producer" (e.g., OPI package or page layout application) may start with a Windows NT or Macintosh server name followed by a local directory path (e.g., "d:\home\images\image1.jpg"). However, the "d:\home" portion of the drive name may be mounted on the RIP server device (e.g., a Unix server) as "/Home". In this case, the system administrator specifies some portion of the path (e.g., "d:\home") to be recognized as the Unix equivalent (e.g., "/Home") when the RIP server device processes the comments. Then, the comment is replaced with a path and filename mounted within the network 12 (e.g., "Home\images\image1.jpg").

Search paths are specified by the administrator to provide full, explicit pathnames to one or more (RIP server-accessible) directories within the network 12 in which data is typically stored. As will be discussed in more detail below, the RIP server 26 searches these paths for objects named in the data stream.

The data stream is transmitted, in a step C, to a first server 32 (e.g., an Open Prepress Specification (OPI) server) for interpreting the comments according to the open specification standard within the network 12, which was defined by the administrator in the step B. The comments are assumed to have been created according to an open specification standard (e.g., by any third-party Open Prepress Interface ("OPI") producer).

A determination is made, in a step D, whether a prescan option is enabled. If the prescan option is not enabled, control passes to a step E for scheduling the data to be RIP'ed; otherwise control passes to a step F for pre-scanning (reading) a portion (e.g., a line or command) of the data.

After the line of data is pre-scanned in the step F, control passes to a step G for determining whether a set of comments (e.g., ImageFileName and/or ImageID) is detected within the line of data. If comments are not detected in the step G, control passes to a step H for determining if the end of the data has been reached (i.e., if the last line of data has been pre-scanned). If it is determined in the step H that the end of the data has not been reached, control returns to the step F for scanning a next line of the data; otherwise, control passes to a step I which, as will be discussed below, determines if any faults are included in the pre-scanned data. If a comment is detected in the step G, control passes to a step J for executing a search to identify the actual location of an image within the network 12 as a function one of the detected comments. A more detailed discussion of the step J is included below.

A determination is made, in a step K, whether the path identified in the step J is valid. If the path is determined in the step K to be invalid, control passes to a step L for recording a fault. Then, control returns to the step F for continuing to pre-scan the data. Otherwise, if all the path values are determined in the step K to be valid, control passes to a step M for determining whether a gathering feature is enabled.

If the gathering feature is not enabled, control passes to a step N for replacing the value of the ImageID comment in the data stream with the valid path identified in the step J. Otherwise, if the gathering feature is enabled, control passes to a step O for retrieving image data from the location (e.g., in a remote network storage 34) specified by the image path value in the step J and storing the image data on a local storage device 36 (e.g., disk). Control then passes to a step P for replacing the ImageID comment value with the appropriate local path within the local storage device 36. Control then returns to the step F for pre-scanning a next line of the data.

Referring again to the step I, if faults are detected in the data, control passes to a step Q for clearing the faults. Control then passes to the step E. Otherwise, if no faults are detected in the step I, control passes to the step E (without executing the step Q).

As discussed above, the data stream is scheduled to be RIP'ed in the step E. Then, in a step R, the data stream, with any path updates from the pre-scan, is read into the processing device 30. A determination is made, in a step S, if a substitution feature is enabled. If the substitution feature is not enabled, control passes to a step T for RIP'ing the data with the proxy images rather than retrieving the high-resolution images; otherwise, control passes to a step U for determining if the prescan feature is enabled.

If the prescan feature is determined to be enabled in the step U, control passes to a step V for setting the current path to the value of the ImageID comment. Then, control passes to a step W for determining whether the current path is valid. If the current path is determined to be valid, control passes to a step X for retrieving the high-resolution image from the OPI server 32, the remote network storage 34, and/or the local disk 36 and substituting the high-resolution image into the data stream. Otherwise, control passes to a step Y (which is discussed in more detail below) for executing the image search to identify a path value for the image referenced in the comment; control then passes to a step Z for determining whether the path value is valid. If the path value is determined to be invalid, control passes to a step AA for faulting the job; otherwise, control passes to the step X.

It is to be understood that if the path value is determined to be invalid, a user optionally may manually enter a path to the image. Then, the data stream may be prescanned again or directly rescheduled for the OPI-aware RIP.

After the high-resolution image is substituted into the data in the step X, control passes to the step T for decomposing the data. Then, in a step BB, a determination is made whether more data is to be evaluated. If more data exists, control returns to the step R; otherwise, control passes to a step CC for producing the data on the output medium 22 via the output device 24. Then, the process stops in a step ZZ.

Figure 3:
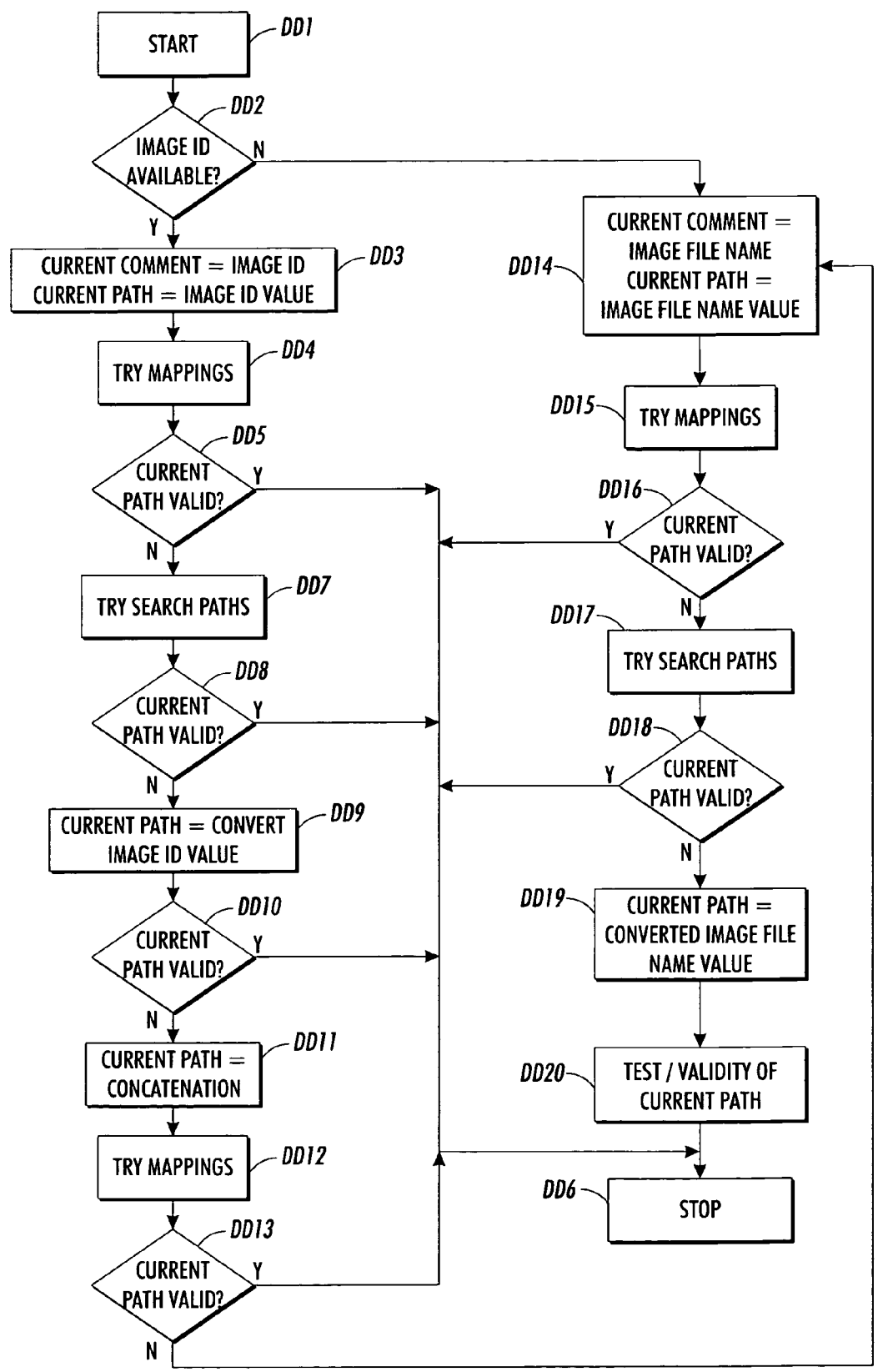
FIG. 3 illustrates a method for executing the image search called for in FIG. 2.

With reference to FIG. 3, the process of executing an image search (see steps J and Y) begins in a step DD1. A determination is made, in a step DD2, whether the ImageID comment is available (i.e.,. specified) in the data stream. If an image identifier is available, control passes to a step DD3 for assigning the value of the ImageID comment to the current comment and the current path. Then, in a step DD4, which is discussed in more detail below, different mappings are attempted. A determination is made in a step DD5 whether the current path determined in the step DD4 is valid. If the current path is valid, control passes to a step DD6 for stopping the process; otherwise, control passes to a step DD7 for attempting different search paths, which is discussed in more detail below.

In a step DD8, a determination is made whether the current path is valid. If the current path is valid, control passes to the step DD6; otherwise, control passes to a step DD9 for assigning the current path as a converted image identifier value, which is calculated in the step DD4. For example, if the mapping or search path identified in the step DD4 or DD7, respectively, is represented in a Unix format, the remaining portion of the current path is also converted to a Unix format. A determination is made in a step DD10 whether the current path is valid. If the current path is valid, control passes to the step DD6; otherwise, control passes to a step D11 for assigning the current path as a concatenation of the directory specified by the ImageFileName comment and the filename specified by the ImageID comment. Then, in a step DD12, different mappings are attempted again (see FIG. 4).

In a step DD13, a determination is made whether the current path is valid. If the current path is valid, control passes to the step DD6; otherwise, control passes to a step DD14. The step DD14 is also executed if in the step DD2, which is discussed above, no ImageID comment is available. In the step DD14, the ImageFileName is assigned as the current comment and the current path. Then, in a step DD15, different mappings are attempted (see FIG. 4).

In a step DD16, a determination is made whether the current path is valid. If the current path is valid, control passes to the step DD6; otherwise, control passes to a step DD17 for attempting different search paths (see FIG. 5). Then, in a step DD18, a determination is made whether the current path is valid. If the current path is valid, control passes to the step DD6; otherwise, control passes to a step DD19 for assigning the ImageFileName value as the current path. Then, in a step DD20, the validity of the current path is tested before control passes to the step DD6 for stopping the process of executing an image search.

Figure 4:
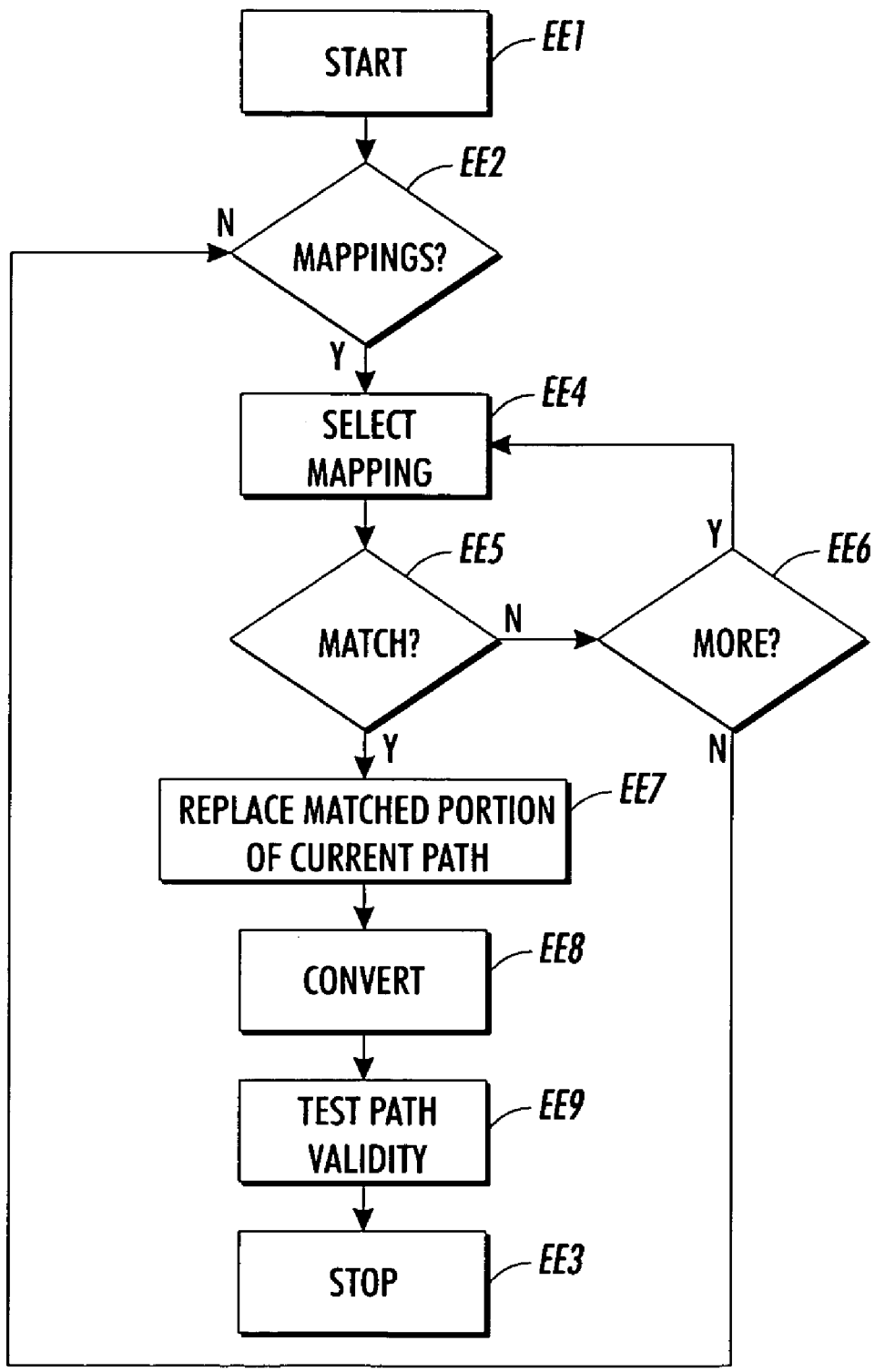
FIG. 4 illustrates a method for attempting to locate different mappings called for in FIG. 3.

With reference to FIG. 4, the steps DD4, DD12, and DD15 of attempting different mappings starts in a step EE1. A determination is made, in a step EE2, whether any mappings exist (i.e., whether mappings were specified in the step B). If no mappings exist, control passes to a step EE3 for stopping the process; otherwise, control passes to a step EE4 for selecting a current mapping. Then, in a step EE5, a determination is made whether there is a match between the selected mapping and a portion of the current comment. For example, if the current comment (e.g., ImageID) specifies a DOS path such as d:\home\files\images\high for the high resolution image and the selected mapping is /home/files (i.e., in a Unix format), a match may be detected in the step EE5. If a match is not detected, control passes to a step EE6 for determining whether more mappings are available. If no more mappings are available, control passes to the step EE3 for stopping the process; otherwise control returns to the step EE4 for selecting a next mapping. If a match is detected in the step EE5, control passes to a step EE7.

In the step EE7, the matched portion of the current path is replaced with the selected mapping. More specifically, in the example discussed above, the d:\home\files portion of the current ImageID comment is replaced with /home/files. Then, in a step EE8, the remainder of the current comment is converted to the format of the current comment. Therefore, the current comment ImageID becomes /home/files/images/high. The validity of the converted path is tested in a step EE9 (e.g., it is verified that the high-resolution image data exists at the location specified in the ImageID comment). Then, the process is stopped in the step EE3.

Figure 5:
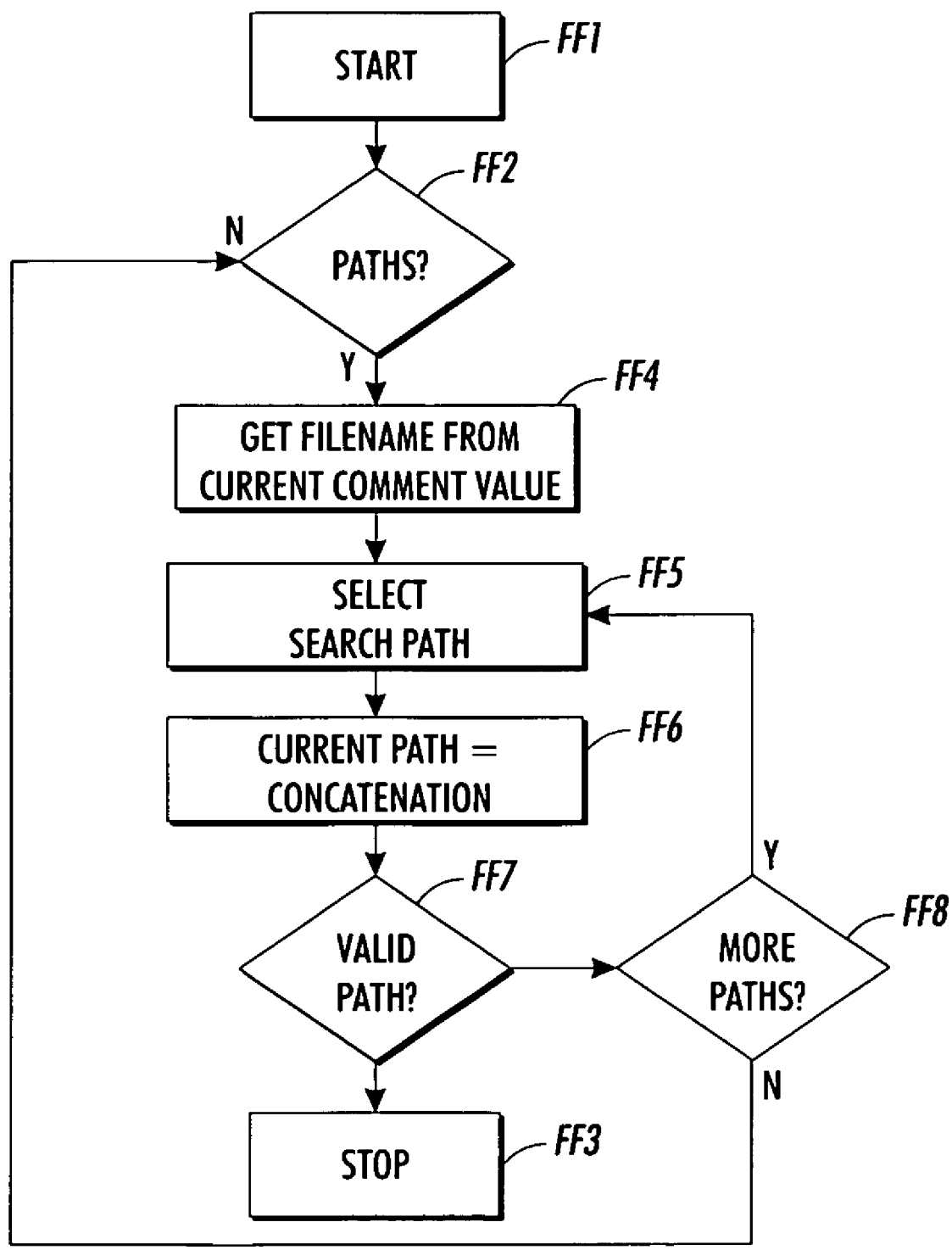
FIG. 5 illustrates a method for attempting to locate different search paths called for in FIG. 3.

With reference to FIG. 5, the steps DD7 and DD17 of attempting different search paths starts in a step FF1. A determination is made in a step FF2 whether any path exists to search (e.g., if any paths were specified in the step B). If no path exists to search, control passes to a step FF3 for stopping the process. If a path does exist, control passes to a step FF4 for determining a filename from the current comment (e.g., the ImageID comment). For example, if the current comment specifies d:\home\files\images\high\image.jpg, the filename is specified as image.jpg. Then, in a step FF5, a current search path is selected (e.g., /home/high-resolution). In a step FF6, the current comment is set as a concatenation of the search path and the filename (e.g., the ImageID comment is set as /home/high-resolution/image.jpg). A determination is made, in a step FF7, whether the current comment is valid (e.g., if data exists at the location specified by the ImageID comment). If the current comment is not valid, control passes to a step FF8 for determining if more paths are available to search. If more paths are available, control returns to the step FF5. If a determination is made in the step FF8 that no more paths are available to search, or if a determination is made in the step FF7 that the path is valid, control passes to the step FF3 for stopping the process.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for determining a location of an image referenced within a stream of document data of a first system, the method comprising:
    prescanning the publication data for verifying the image exists at the location; the prescanning step comprising:
        automatically initiating a scan, by the print controller, of the incoming publication data to search for references to image files which are not locally accessible, and verifying that those references are correct;
    if the image does not exist at the location, manually entering a location of the image; and verifying that the manually entered location of the image is correct;
    finding a comment within the publication data;
    determining a location of the image, stored using a second system different from the first, as a function of the comment;
    gathering the image at a local location;
    retrieving the image based on the verified pathname and inserting the image into the publication data; and
    outputting the publication data to the output medium via the output device.

2. The method for determining a location of the image as set forth in claim 1, wherein:
    the finding step includes:
        identifying, as a function of the comment, a reference to the image within the data stream; and
    the determining step includes:
        determining the location of the image as a function of the reference.

3. The method for determining a location of the image as set forth in claim 1, wherein the determining step includes:
    identifying a potential mapping to a potential location of the image.

4. The method for determining a location of the image as set forth in claim 3, further including:
    identifying an additional potential mapping to an additional potential location of the image.

5. The method for determining a location of the image as set forth in claim 1, wherein the determining step includes:
    identifying a potential search path to a potential location of the image.

6. The method for determining a location of the image as set forth in claim 5, further including:
    identifying an additional search path to an additional potential location of the image.

7. A method for outputting publication data to an output medium via an output device, the method comprising:
    (i) at least one of:
        (a) comparing a comment within the publication data to path mappings to identify a potential pathname of data for an object within the publication data; and
        (b) comparing the comment to search paths to identify the potential pathname of the object data within the publication data;
    (ii) prescanning the publication data for verifying the potential pathname;
    (iii) substituting the verified pathname for the comment in the publication data;
    (iv) retrieving the data based on the verified pathname and inserting the object data into the publication data; and
    (v) outputting the publication data to the output medium via the output device.

8. The method for outputting publication data as set forth in claim 7, further including:
    gathering the output data for the object onto a local memory device.

9. The method for outputting publication data as set forth in claim 7, further including:
    predefining the path mappings and search paths.

10. The method for outputting publication data as set forth in claim 7, further including:
    if the potential pathname is not verified in the prescanning step, prompting a user to manually enter the potential pathname.

11. The method for outputting publication data as set forth in claim 10, further including:
    after the potential pathname is manually entered, rescanning the publication data.

12. The method for outputting publication data as set forth in claim 7, wherein the outputting step includes:
    outputting the publication data within a xerographic environment.

13. The method for outputting publication data as set forth in claim 7, wherein the prescanning step comprises:
    automatically initiating a scan, by the print controller, of the incoming publication data to search for references to image files which may not be locally accessible, and verifying that those references are correct.

* * * * *